United States Patent
Liu et al.

(10) Patent No.: US 12,432,279 B2
(45) Date of Patent: Sep. 30, 2025

(54) METHOD, APPARATUS, STORAGE MEDIUM, AND ELECTRONIC DEVICE FOR CONTROLLING IOT DEVICE

(71) Applicant: Beijing Xiaomi Mobile Software Co., Ltd., Beijing (CN)

(72) Inventors: Peng Liu, Beijing (CN); Xiaodong Gao, Beijing (CN); She Du, Beijing (CN); Guanghui Wang, Beijing (CN); Tingting Shu, Beijing (CN); Kaifeng Duan, Beijing (CN); Yongchao Zhang, Beijing (CN); Bin Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 59 days.

(21) Appl. No.: 18/507,747

(22) Filed: Nov. 13, 2023

(65) Prior Publication Data

US 2024/0406266 A1    Dec. 5, 2024

(30) Foreign Application Priority Data

Jun. 1, 2023   (CN) .......................... 202310643876.7

(51) Int. Cl.
*H04L 67/125* (2022.01)

(52) U.S. Cl.
CPC .................. *H04L 67/125* (2013.01)

(58) Field of Classification Search
CPC .................................................... H04L 67/125
See application file for complete search history.

(56) References Cited

U.S. PATENT DOCUMENTS

| | | | |
|---|---|---|---|
| 11,727,085 B2 * | 8/2023 | Samal | G16Y 40/30 709/223 |
| 2015/0382436 A1 | 12/2015 | Kelly et al. | |
| 2016/0127145 A1 * | 5/2016 | Fu | G05B 19/042 700/275 |
| 2016/0157326 A1 | 6/2016 | Kelly et al. | |
| 2016/0174345 A1 | 6/2016 | Kelly et al. | |
| 2017/0019265 A1 | 1/2017 | Hou et al. | |
| 2018/0316516 A1 | 11/2018 | Fu et al. | |
| 2021/0313079 A1 * | 10/2021 | Samal | G06F 17/18 |

FOREIGN PATENT DOCUMENTS

CN    111818132 A    10/2020

OTHER PUBLICATIONS

Extended European Search Report issued Jun. 7, 2024, in corresponding European Patent Application No. 23214752.0, 8 pages.

* cited by examiner

*Primary Examiner* — Minh Chau Nguyen
(74) *Attorney, Agent, or Firm* — Oblon, McClelland, Maier &Neustadt, L.L.P.

(57) ABSTRACT

The present disclosure provides a method, an apparatus, a storage medium, and an electronic device for controlling an IoT device. The method includes: receiving detection data reported by an IoT device; verifying device control information based on the detection data; and sending, in response to second data in the device control information being successfully verified, a control instruction configured for execution of a pending action to the IoT device to be controlled based on first data. The above method is conductive to improving the response speed of the IoT device.

15 Claims, 5 Drawing Sheets

METHOD, APPARATUS, STORAGE MEDIUM, AND ELECTRONIC DEVICE FOR CONTROLLING IOT DEVICE

CROSS-REFERENCE TO RELATED APPLICATIONS

This application is based upon and claims priority to Chinese Patent Application No. 202310643876.7, filed on Jun. 1, 2023, the entire contents of which are incorporated herein by reference for all purposes.

TECHNICAL FIELD

The present disclosure relates to the technical field of intelligent control, in particular to a method, an apparatus, a storage medium, and an electronic device for controlling an IoT device.

BACKGROUND

With the development of IoT (Internet of Things) technology, more and more IoT devices can be connected to a server and cooperate with each other. For example, in a smart home scenario, if a control rule set by a user is set to automatically turn on the light after the door is opened, the server can control another IoT device to turn on the light after determining that one IoT device has detected opening of the door by the user.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of the present disclosure, a method for controlling an IoT device is provided, including: receiving detection data reported by an IoT device; verifying device control information based on the detection data, wherein the device control information includes separately stored first data and second data, the first data is configured to indicate a pending action set for an IoT device to be controlled, and the second data is configured to indicate an operating parameter condition that needs to be met to execute the pending action; and sending, in response to the second data in the device control information being successfully verified, a control instruction to the IoT device to be controlled based on the first data, wherein the control instruction is configured for execution of the pending action.

According to a second aspect of the present disclosure, a method for controlling an IoT device is provided, including: receiving a control instruction sent by a server, wherein the control instruction is configured for execution of a pending action, and is generated by the server based on first data in device control information when second data in the device control information is successfully verified based on detection data, and wherein the first data and the second data are separately stored, the detection data is reported by an IoT device to the server, the first data is configured to indicate the pending action set for an IoT device to be controlled, and the second data is configured to indicate an operating parameter condition that needs to be met to execute the pending action; and executing the pending action based on the control instruction.

According to a third aspect of the present disclosure, a system for controlling an IoT device, including: an IoT device configured to report detection data to a server, wherein the IoT device includes an IoT device to be controlled, and the IoT device to be controlled is configured to receive a control instruction sent by the server, and execute a pending action based on the control instruction; and the server configured to verify device control information based on the detection data received, wherein the device control information includes separately stored first data and second data, the first data is configured to indicate the pending action set for the IoT device to be controlled, and the second data is configured to indicate an operating parameter condition that needs to be met to execute the pending action; and the server is further configured to send the control instruction to the IoT device to be controlled based on the first data in response to the second data in the device control information being successfully verified, wherein the control instruction is configured for execution of the pending action.

According to a fourth aspect of the present disclosure, an apparatus for controlling an IoT device is provided, including: a receiving module configured to receive detection data reported by an IoT device; a verification module configured to verify device control information based on the detection data, wherein the device control information includes separately stored first data and second data, the first data is configured to indicate a pending action set for an IoT device to be controlled, and the second data is configured to indicate an operating parameter condition that needs to be met to execute the pending action; and a sending module configured to send a control instruction to the IoT device to be controlled based on the first data in response to the second data in the device control information being successfully verified, wherein the control instruction is configured for execution of the pending action.

According to a fifth aspect of the present disclosure, an apparatus for controlling an IoT device is provided, including: an instruction receiving module configured to receive a control instruction sent by a server, wherein the control instruction is configured for execution of a pending action, and is generated by the server based on first data in device control information when second data in the device control information is successfully verified based on detection data, and wherein the first data and the second data are stored separately, the detection data is reported by the IoT device to the server, the first data is configured to indicate the pending action set for an IoT device to be controlled, and the second data is configured to indicate an operating parameter condition that needs to be met to execute the pending action; and an execution module configured to execute the pending action based on the control instruction.

According to a sixth aspect of the present disclosure, an electronic device is provided, including: a processor; and a memory configured to store instructions executable by the processor; wherein the processor is configured to execute the instructions to implement steps of any of the methods described in the above first aspect or the second aspect.

According to a seventh aspect of the present disclosure, a non-transitory computer-readable storage medium is provided, on which a computer program is stored, and when the program is executed by a processor, steps of any of the methods described in the above first aspect or the second aspect is caused to be implemented.

It should be understood that the general description above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure.

DETAILED DESCRIPTION

Figure 1:
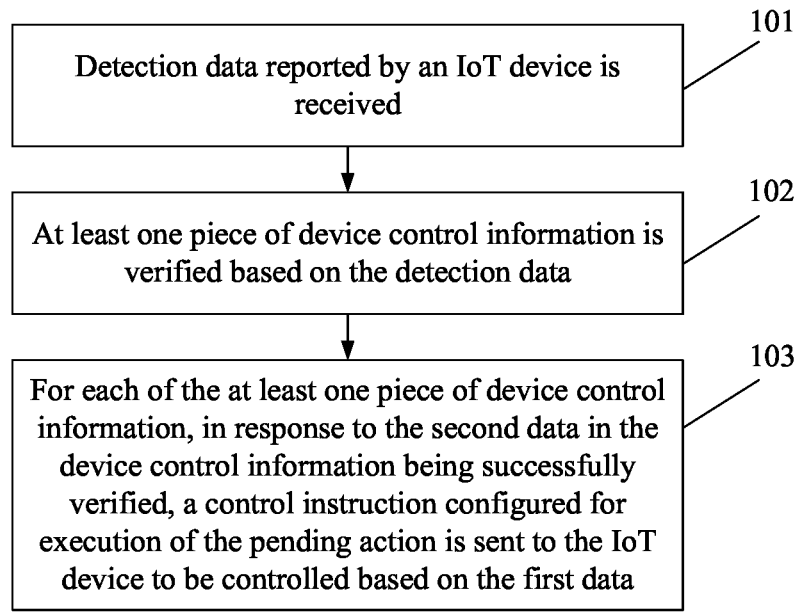
FIG. 1 is a flowchart of a method for controlling an IoT device according to some embodiments of the present disclosure.

Exemplary embodiments will be described in detail herein, examples of which are illustrated in the drawings. When the following description refers to the drawings, the same numerals in different drawings refer to the same or similar elements unless otherwise indicated. The implementations described in the following exemplary embodiments do not represent all implementations consistent with the present disclosure. Rather, they are merely examples of apparatus and methods consistent with aspects of the disclosure as detailed in the appended claims.

The terminology used in the present disclosure is for the purpose of describing particular embodiments only and is not intended to limit the present disclosure. As used in the present disclosure and the appended claims, the singular forms "a", "said", and "the" are intended to include the plural forms as well, unless it clearly dictates otherwise in the context. It should also be understood that the term "and/or" as used herein refers to and includes any and all possible combinations of one or more of the associated listed items.

It should be understood that although the terms first, second, third, etc. may be used in the present disclosure to describe various information, the information should not be limited to these terms. These terms are only used to distinguish information of the same type from each other. For example, without departing from the scope of the present disclosure, the first information can also be referred to as second information, and similarly, the second information can also be referred to as first information. Depending on the context, the word "if" as used herein can be interpreted as "when", or "while", or "in response to determination that".

The IoT technology can enable cooperation and collaboration between various IoT devices connected to the server. As more and more IoT devices are connected to the server, more intelligent control actions can be achieved.

However, as the number of IoT devices connected to the server gradually increases, the control rules for these IoT devices also increase, the server will be easily caused to be unable to respond to each control rule in a timely manner, resulting in delay in a response of the IoT device.

For example, in the smart home scenario, where IoT controls are applied, if only the light IoT device and the door-lock IoT device are connected to the server, then only control requirements based on the light IoT device and the door-lock IoT device can be achieved. For example, the device control information may include: controlling the light IoT device to be turned on when the door-lock IoT device is detected to be opened.

Generally speaking, the device control information includes but is not limited to actions (such as turning on the light) required to be executed by an IoT device, as well as operating parameter conditions (such as the door lock is opened), a device model, a device interface, a data type, a data format, etc. of the IoT device, that need to be met to execute the actions.

There is a considerable amount of information included in the device control information. It is often necessary to read the complete device control information when verifying the operating parameter conditions, which is a waste of time for the process of verifying the operating parameter conditions.

In one of the IoT control scenarios, when more intelligent IoT control in the smart home is desired, it is often necessary to enable the server to have more IoT devices, such as an air conditioner, a television, a sound system, a curtain control device, etc., to be connected. The device control information can be accordingly set to: if the light rays indoor are dim, the door lock is open, and the curtain has been already unfolded up, the light in the living room is then turned on. The action to be executed included in the above device control information is to turn on the light in the living room, and three conditions that need to be met to execute the action include: the light rays indoor are dim, the door lock Is open, and the curtain has been already unfolded up.

In this way, there will be more content included in the device control information, and the server's reading time needs to be further extended longer, resulting in slower response time of the IoT device.

FIG. 1 is a flowchart of a method for controlling an IoT device according to some embodiments of the present disclosure. As shown in FIG. 1, the method is applied to a server, which is communicatively connected to the IoT device. The method includes the following steps.

In step 101, detection data reported by an IoT device is received.

In some embodiments, the detection data can be reported by any one or more IoT devices communicatively connected to the server. The detection data can indicate the environment data detected by IoT devices (such as environmental temperature, humidity, etc.), as well as the data of IoT devices themselves (such as a startup state, a fault condition, a triggering condition, etc.).

In some embodiments, when the IoT devices include a temperature sensor, a light sensor, and a switch sensor, the detection data can be the temperature detected by the temperature sensor, the light intensity detected by the light sensor, the switch state detected by the switch sensor, and so on.

In step 102, at least one piece of device control information is verified based on the detection data. Each of the at least one piece of device control information includes separately stored first data and second data. The first data is configured to indicate a pending action set for an IoT device to be controlled, and the second data is configured to indicate an operating parameter condition that needs to be met to execute the pending action.

The operating parameter condition in the second data can be set by a user, or automatically set by a server based on the user's situation, or the operating parameter condition can be an initial setting condition of the IoT device. The operating parameter condition is set for the detection data, and parameter requirements (for example, the light intensity is less than a first threshold, the door lock is in an opened state, etc.) that the detection data needs to be met are set for the operating parameter condition.

In some embodiments, after the detection data is obtained, at least one piece of device control information can be verified based on the detection data, especially the second data included in the device control information, to determine whether the current detection data meets the operating parameter condition in the second data. If the current detection data meets the operating parameter condition in the second data, a successful verification result for the second data is obtained, and if the current detection data does not meet the operating parameter condition in the second data, a failed verification result for the second data is obtained.

In step 103, for each of the at least one piece of device control information, in response to the second data in the device control information being successfully verified, a control instruction configured for execution of the pending action is sent to the IoT device to be controlled based on the first data.

After a successful verification result of the second data is obtained, it is believed that the IoT device to be controlled can execute the pending action required in the first data. The server can generate the control instruction for the IoT device to execute the pending action and send the control instruction to the IoT device to be controlled, so that the IoT device can execute the corresponding pending action after receiving the control instruction.

In some embodiments, the IoT device to be controlled can be any one or more IoT devices of the multiple IoT devices communicatively connected to the server. Each IoT device communicatively connected to the server can serve as an IoT device for reporting the detection data only, or can be controlled by the server as an IoT device to be controlled while reporting the detection data to the server.

Illustrative explanations will be given by taking the smart home scenario, where IoT controls are applied, as an example.

It is assumed that the server is connected with a door-lock IoT device and a light IoT device. The device control information includes: when the door-lock IoT device is detected to be opened, the light IoT device is controlled to be turned on.

The first data included in the device control information includes: the IoT device to be controlled is the light IoT device, and the pending action is to turn on the light IoT device. The second data included in the device control information includes: the door-lock IoT device is opened. The server stores the first data and the second data corresponding to the device control information, respectively.

When the detection data is received, the second data is directly read from the server. The second data is then verified based on the detection data, to determine whether the current detection data indicates that the door-lock IoT device is opened. If the detection data indicates that the door-lock IoT device is opened, a successful verification result of the second data is obtained. If the detection data indicates that the door-lock IoT device is closed, a failed verification result of the second data will be obtained.

After the successful verification result of the second data is obtained, it is believed that the current door-lock IoT device is opened, and the pending action set through the first data included in the device control information can be executed. Based on the first data, the light IoT device will be turned on.

Technical solutions of embodiments of the present disclosure can provide following beneficial effects. The device control information generally includes the first data configured to set for the pending action of the IoT device to be controlled, as well as the second data configured to set the operating parameter condition that needs to be met to execute the pending action. As a result, it is possible to split the device control information into the first data and the second data for separate storage.

According to embodiments of the present disclosure, after receiving the detection data reported by IoT devices, and when verifying the at least one piece of device control information based on the detection data, the server can read the second data only, as the detection data is only related to the operating parameter condition included in the device control information, and the verifying is performed on the second data only. As a result, it is not necessary to read all device control information, which is conductive to improving the reading speed, and quickly verifying whether the operating parameter condition in the second data is met, so as to send the control instruction to the IoT device to be controlled in a timely manner, for executing the pending action.

Figure 2:
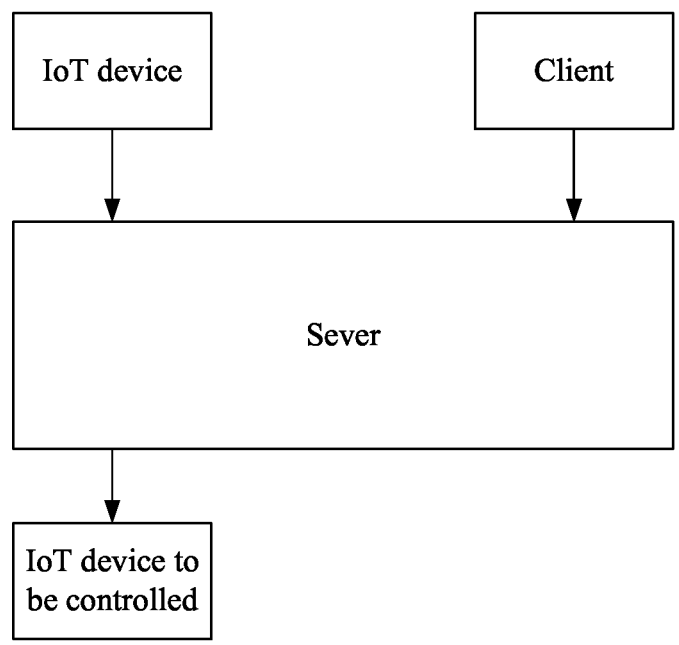
FIG. 2 is a diagram of an application scenario of a method for controlling an IoT device according to some embodiments of the present disclosure.

FIG. 2 is a diagram of an application scenario of a method for controlling an IoT device according to some embodiments of the present disclosure. As shown in FIG. 2, it is assumed that the device control information is generated by a user through a client and then sent to the server. The server receives and stores the device control information, and then receives the detection data reported by the IoT devices. The server verifies the device control information based on the detection data. After a successful verification, the server sends the control instruction to the IoT device to be controlled, which allows the device to be controlled to execute the pending action.

In some embodiments, when the above method is applied to a server, the server includes a data matching module configured to receive the detection data.

The step 101, where the detection data reported by the IoT device is received, includes following steps:

a parameter type corresponding to the operating parameter condition in the second data is determined; the parameter type is sent to the data matching module; and detection data that matches with the parameter type is received based on the data matching module.

In some embodiments, the parameter type is configured to distinguish different detection data, which can be divided according to different IoT devices or a property of information indicated by the detection data. For example, the parameter type can include but is not limited to an environmental temperature, a device temperature, an environmental humidity, a light intensity, a device startup situation, a device failure situation, etc.

Each operating parameter condition is set for one of the parameter types. For example, when the parameter type is the environmental temperature, the operating parameter condition can be set to: the environmental temperature is less than or equal to a second threshold. In some embodiments, the parameter type corresponding to the operating parameter condition can be obtained based on the operating parameter condition in the second data.

The parameter types corresponding to the operating parameter conditions set in the second data are limited. However, since the parameter types reported by the IoT devices connected to the server are diverse, the detection data reported by the IoT devices may not match with the parameter types set in the second data. In some embodiments, it is necessary to send the parameter type obtained by organizing the second data to the data matching module, so that the data matching module can obtain detection data that matches with the parameter type of the operating parameter condition in the second data.

The data matching module can receive only detection data that matches with the parameter type. Alternatively, the data matching module can receive all detection data sent by the IoT devices first, and then screen out detection data that matches with the parameter type from all detection data. In some embodiments, the data matching module includes a first submodule and a second submodule. The first submodule is configured to receive all detection data sent by the IoT devices (for example, the first submodule is configured to run a predetermined device reception service). The second submodule is configured to screen out detection data that matches with the parameter type from all detection data.

According to the above method, valid detection data can be obtained before verification is performed on the second data in the at least one piece of device control information, avoiding invalid verification on the second data using invalid detection data, which is conductive to improving the response speed.

In some embodiments, the detection data includes real-time detection data and state detection data. The real-time detection data is the data sent by the IoT device after the IoT device is triggered, and the state detection data is the data periodically reported by the IoT device. The parameter type includes a first parameter type corresponding to the real-time detection data and a second parameter type corresponding to the state detection data.

The real-time detection data is the data generated by the IoT device after changing an operating state due to triggering by users or by own application programs of the IoT device. For example, when the IoT device is the door-lock device, and when the user opens the door, the door-lock device changes from a closed state to an opened state. The door-lock device is considered to be triggered, and the opened state of the door-lock device is sent as the real-time detection data to the server. For example, when the IoT device is the light device, and when the user presses the start switch of the light device, the light device changes from an off state to an on state. The light device is considered to be triggered, and the on state of the light device is sent as the real-time detection data to the server.

The state detection data enables IoT devices to periodically send their own operating data or self-detected detection data to the server during communication and connection with the server, so that the server can understand operating states, operating situations, and other information of the IoT devices. For example, when the IoT device is a camera, the state detection data can be image information sent by the camera to the server based on a preset period. Alternatively, when the IoT device is a light-ray intensity detection device, the state detection data can be the light-ray intensity information (such as light intensity values) sent by the light-ray intensity detection device to the server based on a preset period.

The difference between the state detection data and the real-time detection data is that the real-time detection data is sent to the server in real time after the IoT device is triggered, and the state detection data may be sent after the IoT device is triggered, or the state detection data may be sent after a period of time after the IoT device is triggered.

The state detection data is not necessarily real-time data. The real-time performance of the state detection data depends on the size of the preset period.

Due to the fact that the parameter type is obtained by organizing the operating parameter condition in the second data, and since the operating parameter condition provides the parameter requirements that the detection data needs to meet, a correspondence relationship also exists between the parameter type and the detection data.

Due to the fact that the detection data includes the real-time detection data and the state detection data, the parameter type is correspondingly divided into the first parameter type corresponding to the real-time detection data and the second parameter type corresponding to the state detection data.

For example, the operating parameter condition set in the second data includes operating parameter condition 1 and operating parameter condition 2.

Operating parameter condition 1: the door lock is opened.
Operating parameter condition 2: the light intensity value is less than or equal to a third threshold.

In some embodiments, operating parameter condition 1 needs to be verified based on the detection data of "switch state of the door lock", and operating parameter condition 2 needs to be verified based on the detection data of "light intensity value".

The parameter types corresponding to the operating parameter condition 1 and the detection data of "switch state of the door lock" are both "door lock". The parameter types corresponding to the operating parameter condition 2 and the detection data of "light intensity value" are both "light intensity".

Since the "switch state of the door lock" is the state generated after the door lock is triggered (for example, when the user opens the door and enables the door lock to change from a closed state to an opened state), the detection data of "switch state of the door lock" is the real-time detection data, and the parameter type "door lock" is the first parameter type. The "light intensity value" is not generated after being triggered, but may be obtained by the IoT device by detecting the current environmental light intensity based on a certain period (for example, detecting every 5 minutes to obtain the current light intensity value and sending it to the server, then the light intensity value remains unchanged within 5 minutes after the IoT device sends it to the server). The detection data of "light intensity value" is the state detection data, and the parameter type "light intensity" is the second parameter type.

Receiving the detection data that matches with the parameter type based on the data matching module includes following steps: real-time detection data that matches with the first parameter type is received based on the data matching module; and after each real-time detection data that matches with the first parameter type is received, state detection data that matches with the second parameter type is received based on the data matching module.

A priority of the real-time detection data is higher than a priority of the state detection data. It is necessary to receive the real-time detection data first before receiving the state detection data, the reasons are as follows.

The real-time detection data is generated after the IoT device is triggered, while the state detection data is periodically reported by the IoT device. If the state detection data is received first and the second data is verified based on the received state detection data, the verification on the second data based on the current state detection data may possibly be caused to be successful. However, due to the fact that the IoT device is not triggered currently, and when the IoT device will be triggered is also not known, waiting for the real-time detection data to be received is still needed after the second data is successfully verified based on the current state detection data. As a result, the state detection data periodically sent by the IoT device may have changed when the real-time detection data is sent to the server, rendering the previous verification result of the second data invalid.

For example, the device control information is to turn on the light device after confirming that the door lock is opened and the light intensity value is less than or equal to the third threshold. Then the first data is to turn on the light device, and the second data is that the door lock is opened and the light intensity value is less than or equal to the third threshold. The operating parameter condition set in the second data includes: operating parameter condition 1: the door lock is opened; and operating parameter condition 2: the light intensity value is less than or equal to the third threshold.

Based on the above analysis, the parameter type corresponding to the operating parameter condition 1 is the first parameter type. The detection data for verifying the operating parameter condition 1 is the real-time detection data. The parameter type corresponding to the operating parameter condition 2 is the second parameter type. The detection data for verifying the operating parameter condition 2 is the state detection data.

It is assumed that the light intensity IoT device reports the light intensity to the server respectively at the $0^{th}$ minute, the $10^{th}$ minute, and the $20^{th}$ minute (corresponding light intensity values are 10, 50, and 40), and that the door-lock IoT device is triggered to open by the user at the $15^{th}$ minute (i.e. it detects that the door-lock IoT device is opened at the $15^{th}$ minute). It is then assumed that the state detection data is received first, and the real-time detection data is received after the state detection data is received. The third threshold is 20. The following situations may occur under the above assumptions.

Since the light intensity value reported by the light intensity IoT device to the server at the $0^{th}$ minute is 10, based on the light intensity value (10) reported at the $0^{th}$ minute and the operating parameter condition 2, when it is determined that the light intensity value required by the operating parameter condition 2 in the second data is less than or equal to the third threshold (20), a successful verification result is obtained (10<the third threshold), then subsequently, it is only necessary to determine whether the real-time detection data can enable a successful verification result of the second data (the operating parameter condition 1).

At the $15^{th}$ minute, the real-time detection data reported by the door-lock IoT device that the door lock has opened is received. The operating parameter condition 1 in the second data is verified based on the real-time detection data and, and a verification result obtained indicates that the verification on the operating parameter condition 1 in the second data is successful. Next, since both operating parameter conditions in the second data are met, the server will send a control command that turns on the light device to the light device. However, the actual light intensity value at the $15^{th}$ minute in the server is 50 (which does not meet the requirements of the operating parameter condition 2, i.e. less than or equal to 20). That is, the server should not send the control command to the light device at this time (i.e. it should not control the light device to be turned on).

If the real-time detection data that matches with each first parameter type is received first, and then the state detection data is received, a verification result of verifying the second data based on the real-time detection data and the state detection data will be valid, which is conductive to obtaining more accurate verification results and avoiding the aforementioned problems.

It should be noted that when the data matching module includes the first submodule and the second submodule, and the second submodule is configured to screen out the detection data that matches with the parameter type from all detection data, the second submodule can further include a message engine configured to obtain the real-time detection data that matches with the first parameter type (for example, a publish subscribe message engine, also known as a pubsub message engine), and a state storage device configured to obtain the state detection data of the second parameter type (for example, the device shadow, which is a virtual mapping of the IoT device on the server, to record the latest and expected states of the device).

When the second submodule includes the publish subscribe message engine configured to obtain the real-time detection data that matches with the first parameter type, the parameter type corresponding to the second data in the device control information can be sent to the publish subscribe message engine after the device control information is received, so as to subscribe to the real-time detection data that matches with the parameter type in the second data from the publish subscribe message engine. In this way, it is possible to receive only real-time detection data that matches with the parameter type of the second data.

In some embodiments, the second data includes separately stored first condition data and second condition data, and a priority of the first condition data is higher than a priority of the second condition data. The detection data includes the real-time detection data and the state detection data. The real-time detection data is the data sent by the IoT device after the IoT device is triggered, and the state detection data is the data periodically reported by the IoT device.

In some embodiments, the second data may provide with the operating parameter conditions therein, and multiple operating parameter conditions can be split into separate operating parameter condition for storage, and each operating parameter condition can be used as the first condition data or the second condition data.

When verifying the at least one piece of device control information based on the detection data in step 102, the following steps are included:
  for each of the at least one piece of device control information, the first condition data in the device control information is verified based on the real-time detection data; if it is determined that each of the first condition data is successfully verified, the second condition data is verified based on the state detection data; and if it is determined that each of the first condition data and each of the second condition data are both successfully verified, it is determined that the second data in the device control information is successful verified.

The first condition data is set for the real-time detection data, and the second condition data is set for the state detection data. Therefore, a priority of the first condition data is higher than a priority of the second condition data.

Before receiving the real-time detection data that meets the first condition data, the verification result obtained by verifying the second condition data based on the state detection data may not always be valid. It is possible that the verification result will be updated after the state detection data is updated, so there is no need to verify the second condition data before the first condition data is verified.

It is necessary to verify the second condition data only after each first condition data has been successfully verified, which can ensure the effectiveness of the verification on the second condition data and improve the verification efficiency.

It should be noted that if the server includes a trigger verification service specifically for verifying the second data based on the real-time detection data, and a state verification service specifically for verifying based on the state detection data, the state verification service needs to verify the second condition data after the trigger verification service has obtained a successful verification result for each first condition data. That is, the trigger verification service performs real-time verification on the first condition data after receiving the real-time detection data. After obtaining the real-time detection data corresponding to each first parameter type, if the trigger verification service successfully verifies each first condition data based on the real-time detection data, it is considered that the state verification service can continue to perform the verification. Then, the state verification service continues to verify each second condition data based on the state detection data currently stored in the state storage device, and obtain a final verification result.

Figure 3:
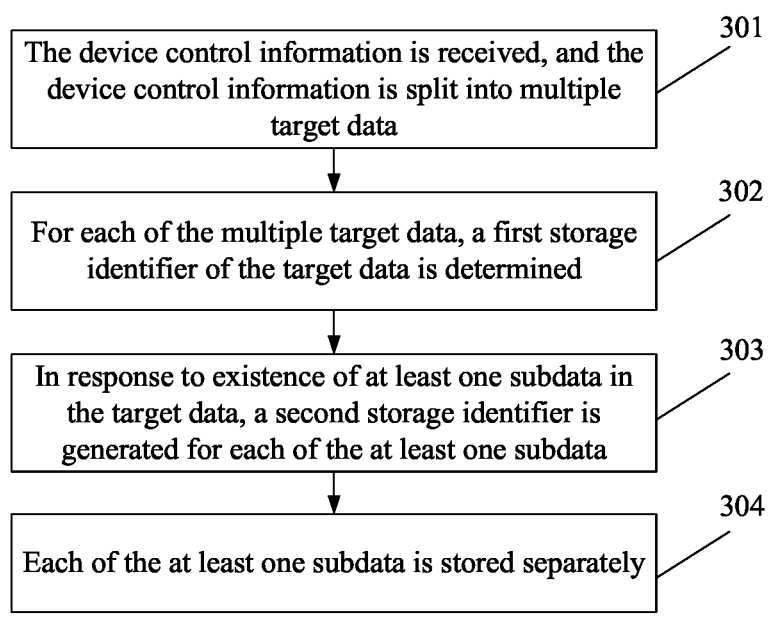
FIG. 3 is a flowchart of a method for controlling an IoT device according to some embodiments of the present disclosure.

In some embodiments, FIG. 3 is another flowchart of a method for controlling an IoT device according to some embodiments of the present disclosure. As shown in FIG. 3, before executing the step 101 to receive the detection data reported by the IoT device, the method further includes the following steps.

In step 301, the device control information is received, and the device control information is split into multiple target data. The target data belongs to the first data, or belongs to the first condition data in the second data, or belongs to the second condition data in the second data.

One (or more) pending action(s) in the device control information is stored as a first data, and each operating parameter condition is stored separately as the first condition data (or the second condition data) in the second data based on the priority (set by the user or automatically determined based on the parameter type corresponding to the operating parameter condition) of each operating parameter condition in the device control information.

In step 302, for each of the multiple target data, a first storage identifier of the target data is determined. The first storage identifier indicates that the target data belongs to the first data, or the first condition data, or the second condition data.

In some embodiments, for one piece of device control information (assuming that a unique encoding corresponding to the device control information is 111), after the device control information is split into multiple target data, for one of the target data, when the target data is the first data, the first storage identifier corresponding to the target data can be set to "action_111", where "action" represents the pending action set in the device control information.

Alternatively, if the target data is the first condition data, the first storage identifier corresponding to the target data can be set to "trigger_111", where "trigger" represents the operating parameter condition in the device control information.

Alternatively, if the target data is the second condition data, the first storage identifier corresponding to the target data can be set to "condition_111", where "condition" represents the operating parameter condition in the device control information.

In step 303, in response to existence of at least one subdata in the target data, a second storage identifier is generated for each of the at least one subdata. The subdata refers to the pending action or the operating parameter condition, and the second storage identifier is configured to distinguish different subdata.

When the target data is the first data, the subdata in the target data is the pending action, and a second storage identifier is set for each pending action (subdata). For example, in response to existence of one subdata, the second storage identifier of the subdata is set to "sort_1", and in response to existence of another subdata, the second storage identifier of this second subdata can be set to "sort_2", and so on.

In some embodiments, when the target data is either the first condition data or the second condition data, the subdata in the target data is the operating parameter condition, and a second storage identifier is set for each operating parameter condition. The second storage identifier of a first subdata can be set to "sort_1", and the second storage identifier of a second subdata can be set to "sort_2".

In step 304, each of the at least one subdata is stored separately. The subdata carries the first storage identifier, the second storage identifier, and a parameter value corresponding to the subdata.

When the target data is the first data, the subdata is the pending action set in the device control information, and the parameter value is configured to represent specific information of the pending action, including but is not limited to the following information.

An execution order of the pending action in the target data, for example, 'order: 1', which indicates that the execution order of the subdata corresponding to the pending action is set to '1'.

An action type of the pending action, for example, 'type: 1', which indicates that the action type of the pending action is set to '1' (for example, '1' is to send a notification).

A custom naming of the pending action, which is configured for display on the client (for example, 'Hello' is set).

A protocol type.

A specific content of the pending action, for example, a delay time, a displaying content, etc. are defined.

In some embodiments, storage results are shown in the table below.

TABLE 1

| First storage identifier | Second storage identifier | Parameter value |
|---|---|---|
| trigger_111 | sort_1 | parameter 1 |
| condition_111 | sort_1 | parameter 2 |
| action_111 | sort_1 | parameter 3 |

In the table, parameter 1, parameter 2, and parameter 3 are only examples and can be modified according to needs. For example, parameter 1 can be modified to: {"order": 1, "src": "device", "key": "prop. 2.1", "name": "left button pushed", "value_type": 4, "protocol_type": 2, "extra_json": {"device_name": "restaurant light", "did": "1027137908.s2", "model": "zimi.switch.dhkg02"}. For this example, "order": 1 indicates the first operating parameter condition; "src": "device" indicates that the detection data is triggered by the IoT device; "key": "prop. 2.1" indicates that an event number of the specific event triggered is "prop. 2.1" (one of the predefined events, such as door lock being opened); "name": "left button pushed" indicates that the content of the subdata corresponding to the operating parameter condition displayed on the user's client is "left button pushed"; "value_type": 4 indicates the value set in the subdata is 4 (Boolean type); "protocol_type": 2 indicates the protocol type is set to 2 (one of the predefined protocol types); and "extra_json" indicates the content of an extension field. For example, in the extension field, following content can be set:

"device_name": "restaurant light", indicating that the device name displayed on the user's client is "restaurant light";

"did": "1027137908.s2", indicating that the unique ID of the device is "1027137908.s2"; and "model": "zimi. switch. dhkg02", indicating that the product model of the device is zimi.switch.dhkg02.

The target data can also be set to "value_json": true, indicating that when the data in the detection data is true, the verification on the operating parameter condition is successful; "sc_id": 6389, indicating that a condition number set for the current target data is "6389"; and "from": 1, indicating that the source of the device control information corresponding to the target data is '1' ('1' is one of the predefined sources).

By storing the device control information through above steps 301 to 304, the device control information can be stored in the database, so that the server can obtain the device control information (especially the second data) in the database and perform corresponding verification when executing the step 102 to verify at least one piece of the device control information based on the detection data. Alternatively, the device control information can be directly stored in the server.

In some embodiments, the device control information is stored based on cluster storage technology.

By using the cluster storage technology to store the device control information, the original storage structure will not be affected when additional storage space is needed, which is conducive to expanding the storage space and improving the response speed of the server.

Figure 4:
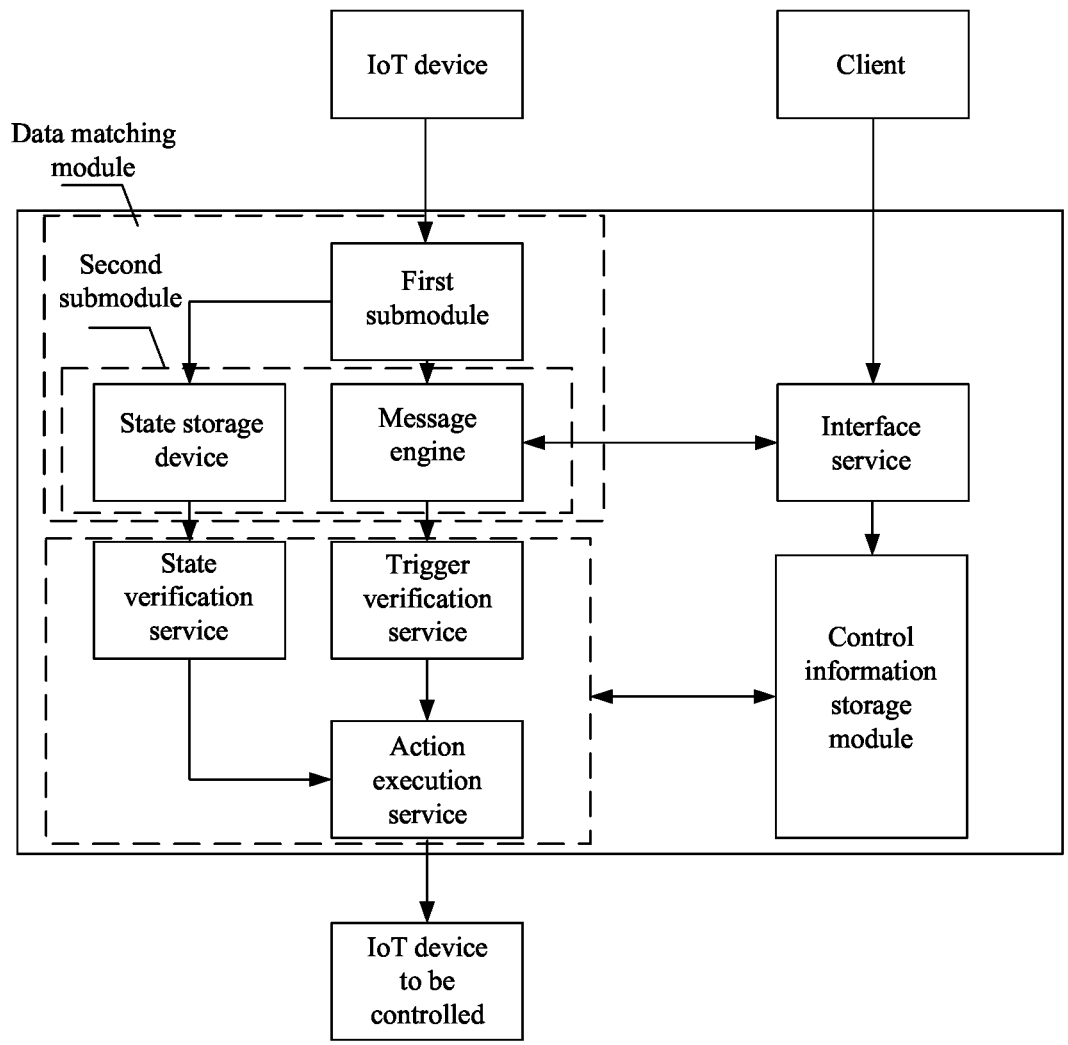
FIG. 4 is a diagram of an application scenario of a method for controlling an IoT device according to some embodiments of the present disclosure.

FIG. 4 is a diagram of an application scenario of a method for controlling an IoT device according to some embodiments of the present disclosure. As shown in FIG. 4, the server specifically includes a data matching module, an interface service (the user receives the device control information sent from the client, determines the corresponding parameter type in the device control information, and sends the device control information to a control information storage module), a control information storage module (for storing the device control information in the form of the first storage identifier, the second storage identifier, and the parameter value), a trigger verification service, a state verification service, and an action execution service (for generating control instructions).

In some embodiments, the data matching module includes a first submodule and a second submodule. The first submodule is configured to receive the detection data reported by the IoT device. The second submodule is configured to screen out the detection data that matches with the parameter type. The second submodule includes a message engine and a state storage device.

It should be noted that the interface service in the drawing is an example of sending the parameter type (or the first parameter type) to the message engine, but the parameter type (or the second parameter type) can also be synchronously sent to the state storage device. Alternatively, the first parameter type is sent to the message engine, and the second parameter type is sent to the state storage device.

It should be noted that in the drawing, no execution order is set for the trigger verification service, the state verification service, and the action execution service. However, in order to achieve better execution results, it is possible to set the trigger verification service to be executed first, the state verification service to be executed after the trigger verification service has completed and all verification results are successful, and the action execution service to be executed after the state verification service has completed.

In some embodiments, a method for controlling the IoT device is provided, which is applied to the IoT device to be controlled. The IoT device to be controlled is communicatively connected to a server. The method includes following steps.

The control instruction configured for execution of a pending action sent by the server is received. The control instruction is generated by the server based on first data in device control information when second data in the device control information is successfully verified based on detection data. The first data and the second data are stored separately. The detection data is reported by the IoT device to the server. The first data is configured to indicate the pending action set for the IoT device to be controlled, and the second data is configured to indicate an operating parameter condition that needs to be met to execute the pending action. The pending action is executed based on the control instruction.

The above content has been explained in the aforementioned embodiments, which will not be repeated herein.

In some embodiments, a system for controlling an IoT device is provided, which includes following constituent parts.

An IoT device (any IoT device in the system) is configured to report detection data to a server.

The server is configured to verify at least one piece of device control information based on the detection data received, and the server is further configured to for each of the at least one piece of device control information, send a control instruction for execution of a pending action to an IoT device to be controlled based on first data in device control information, in response to a successful verification result of second data in the device control information. Each of the at least on piece of device control information includes separately stored first data and second data. The first data is configured to indicate the pending action set for the IoT device to be controlled, and the second data is configured to indicate an operating parameter condition that needs to be met to execute the pending action.

The IoT device to be controlled (one or more IoT device(s) in the system) is configured to receive the control instruction sent by the server for executing the pending action, and execute the pending action based on the control instruction.

In some embodiments, the above content has been explained in the aforementioned embodiments, which will not be repeated herein.

For the sake of simply illustrating, the aforementioned method embodiments are all expressed as a combination of a series of actions. However, those skilled in the art should be aware that the present disclosure is not limited by the order of the actions described, and according to the present disclosure, certain steps can be executed in other sequences or simultaneously.

Those skilled in the art should also be aware that embodiments described in the specification are all optional embodiments, and those actions and modules involved may not necessarily be necessary for the present disclosure.

Embodiments of the present disclosure also provide an apparatus for controlling an IoT device and a corresponding terminal, corresponding to aforementioned method embodiments that achieves the application function.

Figure 5:
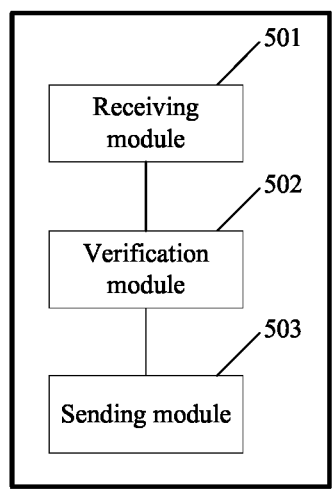
FIG. 5 is a schematic structural diagram of an apparatus for controlling an IoT device according to some embodiments of the present disclosure.

In some embodiments, FIG. 5 is a schematic structural diagram of an apparatus for controlling an IoT device according to some embodiments of the present disclosure. As shown in FIG. 5, the apparatus is applied to a server, which is communicatively connected with the IoT device, and the apparatus includes a receiving module 501, a verification module 502, and a sending module 503.

The receiving module 501 is configured to receive detection data reported by an IoT device.

The verification module 502 is configured to verify at least one piece of device control information based on the detection data. Each of the at least one piece of device control information includes separately stored first data and second data. The first data is configured to indicate a pending action set for an IoT device to be controlled, and the second data is configured to indicate an operating parameter condition that needs to be met to execute the pending action.

The sending module 503 is configured to for each of the at least one piece of device control information, send a control instruction to the IoT device to be controlled based on the first data in response to the second data in the device control information being successfully verified. The control instruction is configured for execution of the pending action.

In some embodiments, the receiving module, when configured to receive detection data reported by the IoT device, is further configured to determine a parameter type corresponding to the operating parameter condition in the second data; send the parameter type to a data matching module; and receive detection data that matches with the parameter type based on the data matching module.

In some embodiments, the detection data includes real-time detection data and state detection data. The real-time detection data is the data sent by the IoT device after the IoT device is triggered, and the state detection data is the data periodically reported by the IoT device. The parameter type includes a first parameter type corresponding to the real-time detection data and a second parameter type corresponding to the state detection data.

The receiving module, when configured to receive the detection data that matches with the parameter type based on the data matching module, is further configured to receive real-time detection data that matches with the first parameter type based on the data matching module; and receive state detection data that matches with the second parameter type based on the data matching module after each real-time detection data that matches with the first parameter type is received.

In some embodiments, the second data includes separately stored first condition data and second condition data, and a priority of the first condition data is higher than a priority of the second condition data. The detection data includes real-time detection data and state detection data. The real-time detection data is the data sent by the IoT device after the IoT device is triggered, and the state detection data is the data periodically reported by the IoT device.

The verification module, when configured to verify the at least one piece of device control information based on the detection data, is further configured to for each of the at least one piece of device control information, verify the first condition data in the device control information based on the real-time detection data; in response to determination that each of the first condition data is successfully verified, verify the second condition data based on the state detection data; and in response to determination that each of the first condition data and each of the second condition data are both successfully verified, determine that the second data in the device control information is successfully verified.

In some embodiments, the device further includes a control information receiving module, a splitting module, a first determination module, a second determination module, and a storage module.

The control information receiving module is configured to receive the device control information before receiving the detection data reported by the IoT device.

The splitting module is configured to split the device control information into multiple target data. The target data belongs to the first data, or belongs to the first condition data in the second data, or belongs to the second condition data in the second data.

The first determination module is configured to determine a first storage identifier of the target data. The first storage identifier indicates that the target data belongs to the first data, the first condition data, or the second condition data.

The second determination module is configured to generate, in response to existence of at least one subdata in the target data, a second storage identifier for each of the at least one subdata. The subdata refers to the pending action or the operating parameter condition, and the second storage identifier is configured to distinguish different subdata.

The storage module is configured to store each of the at least one subdata separately. The subdata carries the first storage identifier, the second storage identifier, and a parameter value corresponding to the subdata.

In some embodiments, the device control information is stored based on a cluster storage technology.

In some embodiments, an apparatus for controlling an IoT device is provided, which is applied to the IoT device to be controlled, and the IoT device to be controlled is communicatively connected to a server. The apparatus includes an instruction receiving module and an execution module.

The instruction receiving module is configured to receive a control instruction sent by a server, the control instruction being configured for execution of a pending action. The control instruction is generated by the server based on first data in device control information when second data in the device control information is successfully verified based on detection data. The first data and the second data are stored separately. The detection data is reported by the IoT device to the server, the first data is configured to indicate the pending action set for an IoT device to be controlled, and the second data is configured to indicate an operating parameter condition that needs to be met to execute the pending action.

The execution module is configured to execute the pending action based on the control instruction.

For apparatus embodiments, since they basically correspond to method embodiments, reference can be made to the explanations of method embodiments for relevant information. The apparatus embodiments described above are only illustrative, where the units described as separate components may be or may not be physically separated, and the components displayed as units may be or may not be physical units. That is, the units can be located in one place or distributed across multiple network units. Some or all modules can be selected according to actual needs to achieve the purpose of the solutions of the present disclosure. Those skilled in the art can understand and implement that without creative efforts.

Embodiments of the present disclosure also provide an electronic device. The electronic device includes a processor, and a memory configured to store instructions executable by the processor. In some embodiments, the processor is configured to execute the instructions to implement the method for controlling an IoT device according to any of above embodiments.

Figure 6:
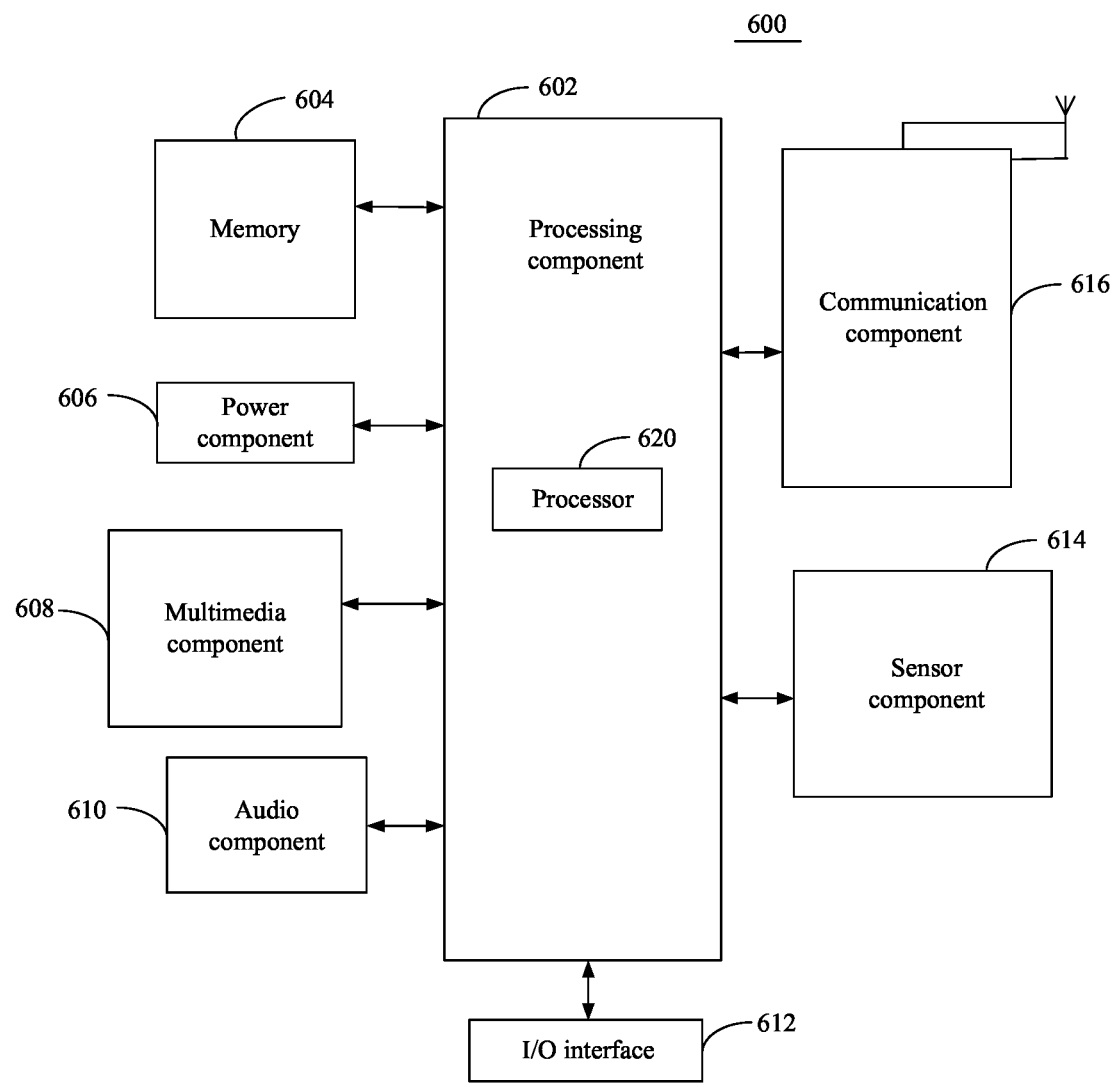
FIG. 6 is a schematic structural diagram of an electronic device according to some embodiments of the present disclosure.

FIG. 6 is a schematic structural diagram of an electronic device according to some embodiments of the present disclosure. For example, electronic device 600 can be a user device, specifically a mobile phone, a computer, a digital broadcasting terminal, a messaging device, a game console, a tablet device, a medical device, a fitness device, a personal digital assistant, a wearable device such as a smart watch, smart glasses, a smart bracelet, smart running shoes, etc.

Referring to FIG. 6, the electronic device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operation of the electronic device 600, such as operations associated with display, telephone call, data communication, camera operation, and recording operations. The processing component 602 may include one or more processors to execute instructions to complete all or part of the methods described above. In addition, the processing component 602 may include one or more modules to facilitate interactions between the processing component 602 and other components. For example, the processing component 602 may include a multimedia module to facilitate interaction between the multimedia component 608 and the processing component 602.

The memory 604 is configured to store various types of data to support operations in the electronic device 600. Examples of such data include instructions, contact data, phone book data, messages, pictures, videos, and the like for any application or method operating on the electronic device 600. The memory 604 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 606 provides power for various components of the electronic device 600. The power component 606 may include a power management system, one or more power supplies, and other components associated with generating, managing, and distributing power for the electronic device 600.

The multimedia component 608 includes a display screen providing an output interface between the electronic device 600 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 608 includes a front camera and/or a rear camera. When the electronic device 600 is in operation mode, such as shooting mode or video mode, the front camera and/or rear camera can receive external multimedia data. Each front camera and rear camera can be a fixed optical lens system or have focal length and optical zoom capability.

The audio component 610 is configured to output and/or input audio signals. For example, the audio component 610 includes a microphone (MIC), which is configured to receive an external audio signal when the electronic device 600 is in an operation mode, such as a calling mode, a recording mode, and a voice recognition mode. The received audio signal may be further stored in memory 604 or transmitted via communication component 616. In some embodiments, the audio component 610 also includes a speaker for outputting audio signals.

The I/O interface 612 provides an interface between the processing component 602 and peripheral interface modules, which can be a keyboard, click wheel, button, etc. These buttons may include, but are not limited to, the Home button, Volume button, Start button, and Lock button.

The sensor component 614 includes one or more sensors for providing various aspects of condition evaluation for the electronic device 600. For example, the sensor component 614 can detect an open/closed state of the electronic device 600, relative positioning of the components. The component is, for example, a display and a keypad of the electronic device 600. The sensor component 614 can also detect changes in the position of the electronic device 600 or one component of the electronic device 600, presence or absence of the user's contact with the electronic device 600, orientation or acceleration/deceleration of the electronic device 600 and temperature change of the electronic device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate wired or wireless communication between the electronic device 600 and other devices. The electronic device 600 can access wireless networks based on communication standards, such as WiFi, 4G, 5G, 4G LTF, 5G NR, or a combination thereof. In some embodiments, the communication component 616 receives a broadcast signal or broadcast related information from an external broadcast management system via a broadcast channel. In some embodiments, the communication component 616 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In some embodiments, the electronic device 600 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods.

In some embodiments, a non-transitory computer-readable storage medium is also provided, such as a memory 604 including instructions, which enables the electronic device 600 to execute any of the aforementioned methods for controlling the IoT device when the instructions in the storage medium are executed by the processor 620 of the electronic device 600.

The non-transitory computer-readable storage medium can be ROM, random access memory (RAM), CD-ROM, tapes, floppy disks, optical data storage devices, etc.

After considering the specification and practices of the aspects disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that the present disclosure is not limited to the precise structure described above and shown in the drawings, and various modifications and changes can be made without departing from its scope. The scope of the present disclosure is limited only by the appended claims.

What is claimed is:

1. A method for controlling an IoT device, performed by a server, the method comprising:
    receiving detection data reported by an IoT device;
    verifying device control information based on the detection data, wherein the device control information includes separately stored first data and second data, the first data is configured to indicate a pending action set for an IoT device to be controlled, and the second data is configured to indicate an operating parameter condition that needs to be met to execute the pending action; and
    sending, in response to the second data in the device control information being successfully verified, a control instruction to the IoT device to be controlled based on the first data, wherein the control instruction is configured for execution of the pending action;
    wherein the method further comprises:
    receiving the device control information before receiving the detection data reported by the IoT device;
    splitting the device control information into multiple target data, wherein the target data belongs to the first data, or belongs to first condition data in the second data, or belongs to second condition data in the second data;
    for each of the multiple target data:
    determining a first storage identifier of the target data, wherein the first storage identifier indicates that the target data belongs to the first data, the first condition data, or the second condition data;
    generating, in response to existence of at least one subdata in the target data, a second storage identifier for each of the at least one subdata, wherein the subdata includes the pending action or the operating parameter condition, and the second storage identifier is configured to distinguish different subdata; and
    storing each of the at least one subdata separately, wherein the subdata carries the first storage identifier, the second storage identifier, and a parameter value corresponding to the subdata.

2. The method according to claim 1, wherein receiving the detection data reported by the IoT device comprises:
    determining a parameter type corresponding to the operating parameter condition in the second data;
    sending the parameter type to a data matching module; and
    receiving detection data that matches with the parameter type based on the data matching module.

3. The method according to claim 2,
    wherein the detection data includes real-time detection data and state detection data, the real-time detection data includes data sent by the IoT device after the IoT device is triggered, and the state detection data includes data periodically reported by the IoT device, and wherein the parameter type includes a first parameter type corresponding to the real-time detection data and a second parameter type corresponding to the state detection data, and
    wherein receiving the detection data that matches with the parameter type based on the data matching module includes:
    receiving real-time detection data that matches with the first parameter type based on the data matching module; and
    receiving state detection data that matches with the second parameter type based on the data matching module after each real-time detection data that matches with the first parameter type is received.

4. The method according to claim 1,
    wherein the second data includes the first condition data and the second condition data stored separately, and a priority of the first condition data is higher than a priority of the second condition data; and wherein the detection data includes real-time detection data and state detection data, the real-time detection data includes data sent by the IoT device after the IoT device is triggered, and the state detection data includes data periodically reported by the IoT device, and
    wherein verifying the device control information based on the detection data includes:
    verifying the first condition data in the device control information based on the real-time detection data;
    in response to determination that each of the first condition data is successfully verified, verifying the second condition data based on the state detection data; and
    in response to determination that each of the first condition data and each of the second condition data are both successfully verified, determining that the second data in the device control information is successfully verified.

5. The method according to claim 1, wherein the device control information is stored based on a cluster storage technology.

6. A non-transitory computer-readable storage medium storing instructions that, when executed by one or more processors, cause the method for controlling the IoT device according to claim 1 to be implemented.

7. A system for controlling an IoT device, the system comprising:
    an IoT device configured to report detection data to a server, wherein the IoT device includes an IoT device to be controlled, and the IoT device to be controlled is configured to receive a control instruction sent by the server, and execute a pending action based on the control instruction; and
    the server configured to verify device control information based on the detection data received, wherein the device control information includes separately stored first data and second data, the first data is configured to indicate the pending action set for the IoT device to be controlled, and the second data is configured to indicate an operating parameter condition that needs to be met to execute the pending action; the server is further configured to send, in response to the second data in the device control information being successfully verified, the control instruction to the IoT device to be controlled based on the first data, wherein the control instruction is configured for execution of the pending action; the server is further configured to receive the device control information before receiving the detection data reported by the IoT device; and split the device control information into multiple target data, wherein the target data belongs to the first data, or belongs to first condition data in the second data, or belongs to second condition data in the second data; and the server is further configured to, for each of the multiple target data: determine a first storage identifier of the target data, wherein the first storage identifier indicates that the target data belongs to the first data, the first condition data, or the second condition data; generate, in response to existence of at least one subdata in the target data, a second storage identifier for each of the at least one subdata, wherein the subdata includes the pending action or the operating parameter condition, and the second storage identifier is configured to distinguish different subdata; and store each of the at least one subdata separately, wherein the subdata carries the first storage identifier, the second storage identifier, and a parameter value corresponding to the subdata.

8. The system according to claim 7, wherein the server is further configured to:
determine a parameter type corresponding to the operating parameter condition in the second data;
send the parameter type to a data matching module; and
receive detection data that matches with the parameter type based on the data matching module.

9. The system according to claim 8,
wherein the detection data includes real-time detection data and state detection data, the real-time detection data includes data sent by the IoT device after the IoT device is triggered, and the state detection data includes data periodically reported by the IoT device, and wherein the parameter type includes a first parameter type corresponding to the real-time detection data and a second parameter type corresponding to the state detection data; and
wherein the server is further configured to:
receive real-time detection data that matches with the first parameter type based on the data matching module; and
receive state detection data that matches with the second parameter type based on the data matching module after each real-time detection data that matches with the first parameter type is received.

10. The system according to claim 7,
wherein the second data includes the first condition data and the second condition data stored separately, and a priority of the first condition data is higher than a priority of the second condition data; and wherein the detection data includes real-time detection data and state detection data, the real-time detection data includes data sent by the IoT device after the IoT device is triggered, and the state detection data includes data periodically reported by the IoT device; and
wherein the server is further configured to:
verify the first condition data in the device control information based on the real-time detection data;
in response to determination that each of the first condition data is successfully verified, verify the second condition data based on the state detection data; and
in response to determination that each of the first condition data and each of the second condition data are both successfully verified, determine that the second data in the device control information is successfully verified.

11. The system according to claim 7, wherein the device control information is stored based on a cluster storage technology.

12. A method for controlling an IoT device, performed by an IoT device to be controlled, the method comprising:
receiving a control instruction sent by a server, wherein the control instruction is configured for execution of a pending action, and is generated by the server based on first data in device control information when second data in the device control information is successfully verified based on detection data; wherein the first data and the second data are separately stored, the detection data is reported by an IoT device to the server, the first data is configured to indicate the pending action set for an IoT device to be controlled, and the second data is configured to indicate an operating parameter condition that needs to be met to execute the pending action; and wherein the device control information is received by the server before receiving the detection data and split into multiple target data, the target data belonging to the first data, or belonging to first condition data in the second data, or belonging to second condition data in the second data, and for each of the multiple target data:
a first storage identifier of the target data is determined, wherein the first storage identifier indicates that the target data belongs to the first data, the first condition data, or the second condition data;
in response to existence of at least one subdata in the target data, a second storage identifier is generated for each of the at least one subdata, wherein the subdata includes the pending action or the operating parameter condition, and the second storage identifier is configured to distinguish different subdata; and
each of the at least one subdata is stored separately, wherein the subdata carries the first storage identifier, the second storage identifier, and a parameter value corresponding to the subdata; and
executing the pending action based on the control instruction.

13. An electronic device comprising:
a processor; and
a memory configured to store instructions executable by the processor,
wherein the processor is configured to execute the instructions to implement the method for controlling the IoT device according to claim 12.

14. A non-transitory computer-readable storage medium storing instructions that, when executed by one or more processors, cause the method for controlling the IoT device according to claim 12 to be implemented.

15. An electronic device comprising:
a processor; and
a memory configured to store instructions executable by the processor,
wherein the processor is configured to execute the instructions to implement the method for controlling the IoT device according to claim 1.

* * * * *